US012612977B2

(12) United States Patent
Jaśkiewicz et al.

(10) Patent No.: US 12,612,977 B2
(45) Date of Patent: Apr. 28, 2026

(54) SINGLE STAGE SERVO VALVE ASSEMBLY

(71) Applicant: Hamilton Sundstrand Corporation, Charlotte, NC (US)

(72) Inventors: Zbigniew Jaśkiewicz, Wrocław (PL); Kamil Mastalerz, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 64 days.

(21) Appl. No.: 18/921,638

(22) Filed: Oct. 21, 2024

(65) Prior Publication Data

US 2025/0137547 A1 May 1, 2025

(30) Foreign Application Priority Data

Oct. 26, 2023 (EP) .................................... 23461672

(51) Int. Cl.
 *F16K 31/124* (2006.01)
 *F15B 13/044* (2006.01)
 (Continued)

(52) U.S. Cl.
 CPC .......... *F16K 31/124* (2013.01); *F15B 13/044* (2013.01); *F16K 11/044* (2013.01);
 (Continued)

(58) Field of Classification Search
 CPC ...... F16K 31/124; F16K 11/044; F16K 11/22; F16K 31/0682; F15B 13/044; F15B 13/0438
 See application file for complete search history.

(56) References Cited

U.S. PATENT DOCUMENTS 3,712,339 A * 1/1973 Bartholomaus ..... F15B 13/0438
 137/625.62
3,874,405 A * 4/1975 Thayer ................ F15B 13/0438
 137/625.62
(Continued)

FOREIGN PATENT DOCUMENTS

EP 4141263 A1 3/2023
GB 2104249 A 3/1983

OTHER PUBLICATIONS

European Search Report for Application No. 23461672.0, mailed Mar. 25, 2024, 6 pages.

*Primary Examiner* — John Bastianelli
(74) *Attorney, Agent, or Firm* — CANTOR COLBURN LLP

(57) ABSTRACT

A single stage servo valve assembly includes a drive assembly and a valve body assembly. The valve body assembly defines a valve body extending along a valve body axis (X) between a first valve body end and a second valve body end, a supply port, a control port and a return port formed through the valve body each defining a respective fluid flow channel, having a fluid flow axis, providing fluid communication between an interior of the valve body and an exterior of the valve body. The drive assembly operates to control the flow of fluid between the supply port, the control port and the return port, via the interior of the valve body, in response to an electric command signal; wherein a first nozzle is located in the valve body between the supply port and the control port and a second nozzle is located between the ports.

10 Claims, 7 Drawing Sheets

(51) Int. Cl.

| | | |
|---|---|---|
| *F16K 11/044* | (2006.01) |
| *F16K 11/22* | (2006.01) |
| *F16K 31/06* | (2006.01) |
| *F15B 13/043* | (2006.01) |

(52) U.S. Cl.

CPC .......... *F16K 11/22* (2013.01); *F16K 31/0682* (2013.01); *F15B 13/0438* (2013.01)

(56)     References Cited

U.S. PATENT DOCUMENTS

| | | | |
|---|---|---|---|
| 4,131,130 | A | 12/1978 | Ruby |
| 4,285,363 | A | 8/1981 | Kolm |
| 5,240,041 | A | 8/1993 | Garnjost |
| 5,522,301 | A | 6/1996 | Roth et al. |
| 6,202,669 | B1 | 3/2001 | Vetsch et al. |
| 9,309,900 | B2 | 4/2016 | Kopp |
| 10,767,778 | B2 | 9/2020 | Jaskiewicz |
| 11,112,024 | B2 * | 9/2021 | Reszewicz .......... F16K 31/0679 |
| 11,566,722 | B2 | 1/2023 | Bujewicz et al. |
| 2015/0047729 | A1 | 2/2015 | Kopp et al. |
| 2023/0175595 | A1 | 6/2023 | Bujewicz et al. |

* cited by examiner

SINGLE STAGE SERVO VALVE ASSEMBLY

CROSS-REFERENCE TO RELATED APPLICATIONS

This application claims the benefit of European Patent Application No. 23461672.0 filed Oct. 26, 2023, the disclosure of which is incorporated herein by reference in its entirety.

TECHNICAL BACKGROUND

The present disclosure is concerned with servo valves and, in particular, single stage servo valves.

BACKGROUND

Servo valves find a wide range of applications for controlling air, fuel, oil or other fluid flows to effect driving or control of another part, e.g., an actuator.

A servo valve assembly may include a drive assembly such as a torque motor controlled by a control current which controls fluid flow to or from an actuator.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic, fuel and hydraulic fluids to an actuator, e.g. to control moving parts such as guide vane actuators or butterfly valves in fuel or air systems. Some examples of applications are aircraft, automotive systems and in the space industry.

Conventionally, servo valve systems operate by obtaining pressurised fluid from a high pressure source e.g. an aircraft engine fuel pump (which also provides fuel to the engine for combustion) which is transmitted through the valve from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

In the case of two-stage servo valves, a first stage with a motor e.g. an electrical or electromagnetic force motor or torque motor is controlling a moveable member, typically a flapper, or a jet pipe, is deflected by action of an armature connected to the motor away from or towards nozzles, which controls the fluid flow through the nozzles. The motor can operate to position the moveable member in response to an input drive signal or control current, to control flow through the first, pilot, stage which controls fluid flow to drive the second stage valve member e.g. the spool valve by controlling the flow of fluid acting on the spool. Movement of the spool causes alignment between the ports and fluid channels to be changed to define different flow paths for the control flow which, in turn, can control flow of hydraulic fluid and by creating a pressure imbalance on an element that is controlled by the servo valve e.g. an actuator, enables precise movement or force control.

For low power applications, servo valves can be single stage valves, where the motor drives the flapper to control fluid flow through the main (single) stage of the valve, i.e. the valve body.

Conventional single stage servo valve systems will be described in more detail below with reference to FIGS. 1A and 1B.

In summary, in a conventional single-stage flapper type servo valve, a valve body is provided with a supply port, a control port and a return port. The valve is configured to regulate the flow of fluid from the supply port through the control port from where the fluid flows to e.g. an actuator to be controlled. With a flapper type valve, nozzles are provided in the valve body between the supply port and the control port and between the control port and the return port. A flapper element is positioned between the nozzles in the valve body and is movable relative to the nozzles according to a command signal. The flapper, in a neutral or 'null' position is equidistant between the nozzles such that the there is no flow out of the valve from the control port and nearly all fluid flows from the supply port via the control port to the return port. If it is required to provide greater flow through the control port, the flapper is driven such that it moves closer to the nozzle between the control port and the return port than the nozzle between the supply port and the control port. This then closes (or reduces) the flow path between the control port and the return port and opens/increases the size of the flow path between the supply port and the control port. If the flapper is driven in the opposite direction, the flow path between the supply port and the control port is reduced/blocked and the flow path between the control port and the return port is opened/increased.

The flapper is driven by a torque motor that causes rotation of the flapper in response to the command signal. The flapper assembly conventionally includes an elongate flapper element mounted to a torsion spring or torsion shaft supported on a torsion bridge. The plate is mounted between coils of the torque motor, with precise air gaps, for biasing the flapper to its neutral or zero position between the nozzles of the valve body. An electrical command signal to the motor excites the motor coils which cause rotation of the flapper.

Because the neutral position requires the flapper to be equidistant from the nozzles, but also able to move relative to the nozzles during operation, there is, in the neutral position, always a small gap either side of the flapper, between the flapper and each nozzle. This means that there is always some inherent leakage in the servo valve. As mentioned above, in aircraft, for example, the fuel that controls the servo valve typically comes from the same fuel pump that provides fuel to the aircraft engine. The actuators, and servo valves, however typically require higher pressure fuel than the engine and, as mentioned, also have some inherent energy loss. This means that in order to be able to operate the servo valves, when needed, the fuel pump needs to be designed to have extra capacity to take this pressure requirement and loss or leakage into account. The additional pump capacity is, however, not needed at many phases of flight when there is no operation of the servo valve. In these phases, in fact, only the fuel pump capacity for the engine is needed. For most of the operation, therefore, the fuel pump has excess capacity and this results in a corresponding decrease in engine efficiency.

Further, the way in which the flapper moves to close one or other of the nozzles, from its neutral position, means that a relatively large displacement of the flapper is needed for a relatively low-pressure output—i.e. the pressure characteristic is 'shallow'.

Single stage servo valves are simpler, smaller and lighter than two-stage servo valves, but suffer from disadvantages in terms of efficiency, which make them less suitable for many applications. At the present time, therefore, two stage servo valves are used for those applications. It would be beneficial to be able to use single stage servo valves in more applications, if they could be made more efficient.

SUMMARY

According to the disclosure, there is provided a single stage servo valve assembly comprising: a drive assembly; and a valve body assembly, the valve body assembly defining a valve body extending along a valve body axis between a first valve body end and a second valve body end; a supply port, a control port and a return port formed through the valve body each defining a respective fluid flow channel, having a fluid flow axis, providing fluid communication between an interior of the valve body and an exterior of the valve body, wherein the drive assembly operates to control the flow of fluid between the supply port, the control port and the return port, via the interior of the valve body, in response to an electric command signal; wherein a first nozzle is located in the valve body between the supply port and the control port and a second nozzle is located between the return port and the control port, the first nozzles defining a first fluid flow paths from the supply port to the control port and the second nozzle defining a fluid flow path between the control port and the return port; wherein the drive assembly comprises a flapper means extending along a flapper means axis in a direction essentially perpendicular to the valve body axis from a first end in connection with the drive assembly to a second end that extends into a space between the first nozzle and the second nozzle, the second end being moveable about the flapper means axis, by means of the drive means, relative to the nozzles; the assembly characterised in that the drive means comprises a first torque motor located on a first side of the valve body and a second torque motor located on a second side of the valve body opposite the first side as defined with respect to the valve body axis, and wherein the flapper means comprises a first elongate flapper extending from the first torque motor and a second elongate flapper extending from the second torque motor, wherein the second end of the first flapper is located adjacent the first nozzle and the second end of the second flapper is located adjacent the second nozzle.

BRIEF DESCRIPTION OF THE DRAWINGS

Examples of a servo valve assembly according to the disclosure will now be described with reference to the drawings. It should be understood that variations are possible within the scope of the claims.

DETAILED DESCRIPTION

A servo valve as described below can, for example, be used in an actuator control system. The servo valve is controlled by a drive assembly to control a flow of fluid that is output to control the movement of an actuator.

Figure 1A:
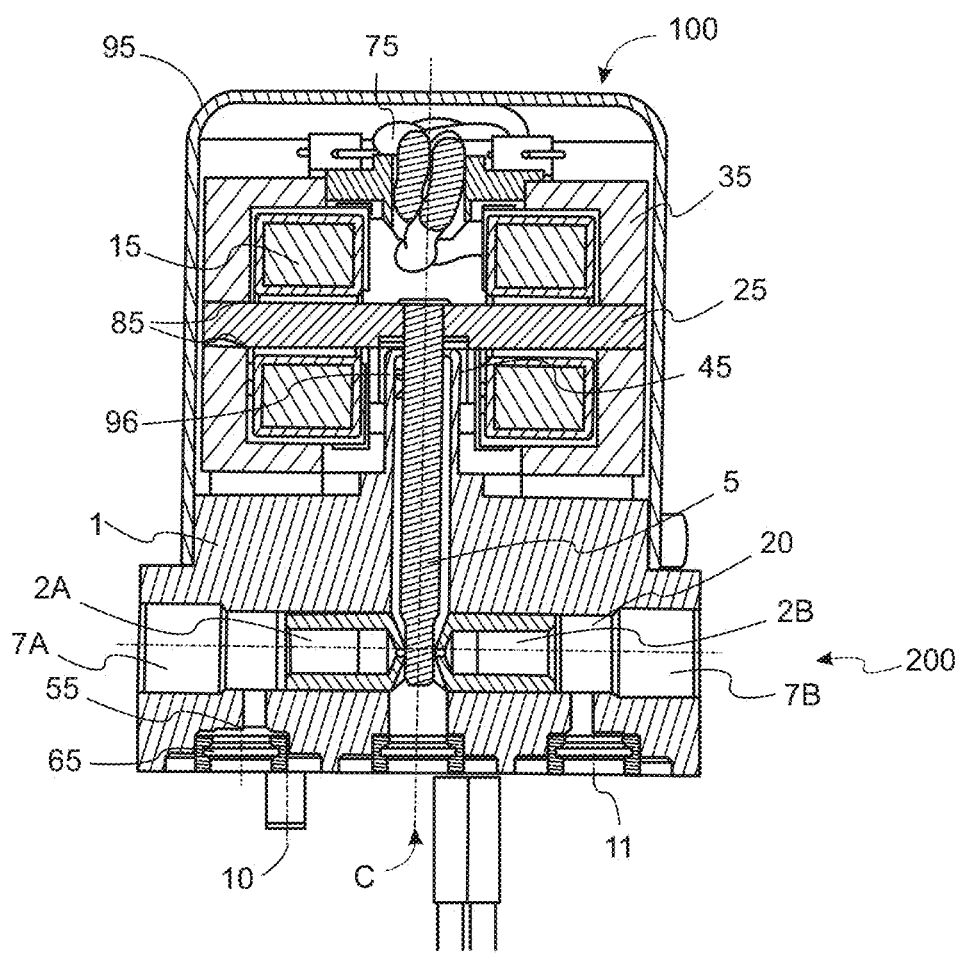
FIG. 1A shows a section through a conventional flapper type single stage servo valve.
Figure 1B:
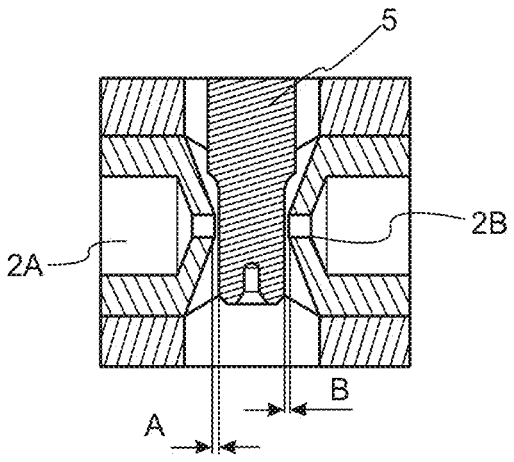
FIG. 1B is a close up view of the nozzles of the servo valve of FIG. 1A.

Conventional single-stage flapper servo valves will first be described with reference to FIGS. 1A and 1B, by way of background A typical single-stage flapper servo valve is shown in FIGS. 1A and 1B. The assembly comprises a drive assembly 100, and a valve body assembly 200. The valve body assembly includes a housing 1 defining a valve body 20 closed at each end by a plug 7A, 7B. Pressurised fluid is provided to the valve body 20 from a supply port 10 and exits the valve body 20 via a return port 11. A flapper 5 extends into the valve body 20. The position of the flapper 5 in the valve body 20 is controlled by the drive assembly to regulate the flow of pressurised fluid from the valve body 20 out through a control port C to control e.g. a piston of the actuator or other moveable part. Nozzles 2A, 2B are provided in the valve body 20 either side of the flapper 5. The first nozzle 2A is between the flapper and the supply port 10 and the second nozzle 2B is between the flapper and the return port 11. In a balanced or neutral position, the flapper is equidistant from both nozzles and so the gap A, between the first nozzle 2A and the flapper 5 is equal to the gap B between the flapper and the second nozzle 2B. Fluid pressure is, therefore, equal either side of the flapper. If it is desired to provide fluid from the control port C to e.g. move an actuator piston (not shown) in a given direction, a command is provided to the drive, which in FIG. 1A is a torque motor, which pivots the flapper towards nozzle 2B—i.e. from left to right in FIGS. 1A and 1B, which increases gap A to increase the fluid flow passage from the first nozzle 2A such that fluid from the supply port 10 flows out through the control port C. The more the flapper turns from the neutral position, e.g. to the right, the greater is gap A compared to gap B and so the fluid flow to port C (and beyond) is greater, while the flow to return port 11 is less. This difference causes the piston to move in a first direction. If the position of the flapper is reversed and gap A is smaller than gap B, then there is less flow through nozzle 2A to port C and more flow from port C to port 11, which causes the piston to move in the opposite direction. Filters 55 and/or screen rings 65 may be provided to filter fluid at the ports.

In more detail, in the conventional flapper type assemblies, to open the servo valve, control current is provided to coils 15 of the motor (e.g. a torque motor) creating electromagnetic torque opposing the sum of mechanical and magnetic torque already 'present' in the torque motor. The bigger the electromagnetic force from the coils, the more the flapper pivots. The more it pivots, the greater the flow through the control port C. A torque motor usually consists of coil windings 15, a ferromagnetic armature 25, permanent magnets 35 and a mechanical spring forming a torsional bridge 45 (e.g. two torsional bridge shafts). This arrangement provides movement of the flapper proportional to the input control current.

Electric wiring 75 is provided to provide the command signal to the motor.

Air gaps 85 are provided between the motor coils and the armature to ensure precise positioning of the flapper in its neutral position between the nozzles. These air gaps have to be precisely cut. If there is any imprecision in the size and shape of the air gaps, this can result in valve failure where the armature 25 plate to the pole pieces of the motor. The cutting process is performed by an EDM machine and is time consuming. Because the process takes place on the assembled valve fluid used in the cutting process can introduce dirt which, if not properly rinsed, can block the valve during operation.

The drive assembly 100 is enclosed by a cover 95 that sits on the housing 1 of the valve assembly 200.

An O-ring 96 can provide sealing support around the flapper.

As mentioned above, conventional flapper type servo valves often require an over-capacity fuel pump to operate due to losses caused by the position of the flapper relative to the nozzles.

The servo valve of the present disclosure provides an alternative structure and principle of operation to overcome these problems. An example will be described with reference to FIGS. 2 to 7. Where the description refers to 'fluid' this may be air or fuel or other hydraulic or pressurised fluid.

Rather than having a single flapper common to both nozzles, the assembly according to this disclosure uses two flappers, each driven by a respective torque motor, extending into the space between the nozzles from different sides of the valve body axis X, where the end of a first flapper is associated with and adjacent the first nozzle and the end of the second flapper is associated with and adjacent the second nozzle, as described further below.

As with the known assembly shown in FIG. 1A, the servo valve assembly comprises a drive assembly 1000, and a valve body assembly 2000. The valve body assembly includes a housing 1001 defining a valve body 2001 closed at each end by a plug 700A, 700B. Pressurised fluid is provided to the valve body 2001 from a supply port 101 and exits the valve body 2001 via a return port 103. A first nozzle 201A is positioned in the valve body between the supply port and the control port and a second nozzle 201B is positioned in the valve body between the return port and the control port. The nozzles channel the fluid between the respective ports. A first flapper 501 extends into the valve body 2001 from a first side of the valve body axis. The first flapper 501 has a first end 502 in driving engagement with a first torque motor 600A of the drive assembly 1000 and a second end 503 extending into the region S between the first nozzle 201A and the second nozzle 201B, adjacent the first nozzle 201A. The second flapper 510 has a first end 511 in driving engagement with a second torque motor 600B of the drive assembly 1000 and a second end 512 extending into the region S between the first nozzle 201A and the second nozzle 201B, adjacent the second nozzle 201B—i.e. between the second end of the first flapper and the second nozzle. The positions of the flappers 501, 510 in the valve body 2001 relative to the respective nozzles 201A, 201B, is controlled by the torque motors 600A, 600B of the drive assembly 1000 to regulate the flow of pressurised fluid from the valve body 2001 out through the control port 102 to control e.g. a piston of the actuator or other moveable part.

As with the known assembly of FIG. 1A, filters 550 and/or screen rings 650 may be provided to filter fluid at the ports.

Operation of each of the torque motors to drive their respective flappers may be similar to operation of the single torque motor and flapper of FIG. 1A. E.g. to move the flapper relative to the nozzle, control current is provided to coils 615A, 615B of the motor (e.g. a torque motor) 600A, 600B creating electromagnetic torque opposing the sum of mechanical and magnetic torque already 'present' in the torque motor. The bigger the electromagnetic force from the coils, the more the flapper pivots. A torque motor usually consists of coil windings 615A, 615B, a ferromagnetic armature 625A, 625B, permanent magnets 635A, 635B and a mechanical spring forming a torsional bridge 645A, 645B (e.g. two torsional bridge shafts). This arrangement provides movement of the flapper proportional to the input control current.

Electric wiring may be provided to provide the command signal to the motor.

Air gaps 685 A, 685B are provided between the motor coils and the armature to ensure precise positioning of the flapper in its neutral position relative to the nozzles.

The drive assembly 1000 may be enclosed by a cover 995A, 995B that sits on the housing of the valve assembly 2000.

O-rings 996A, 996B can provide sealing support around the flappers.

The type of and operation of the motor is just one example and other drive means are also possible for driving the flappers.

Operation of the assembly will now be described in more detail.

Figures 4A, 4B:
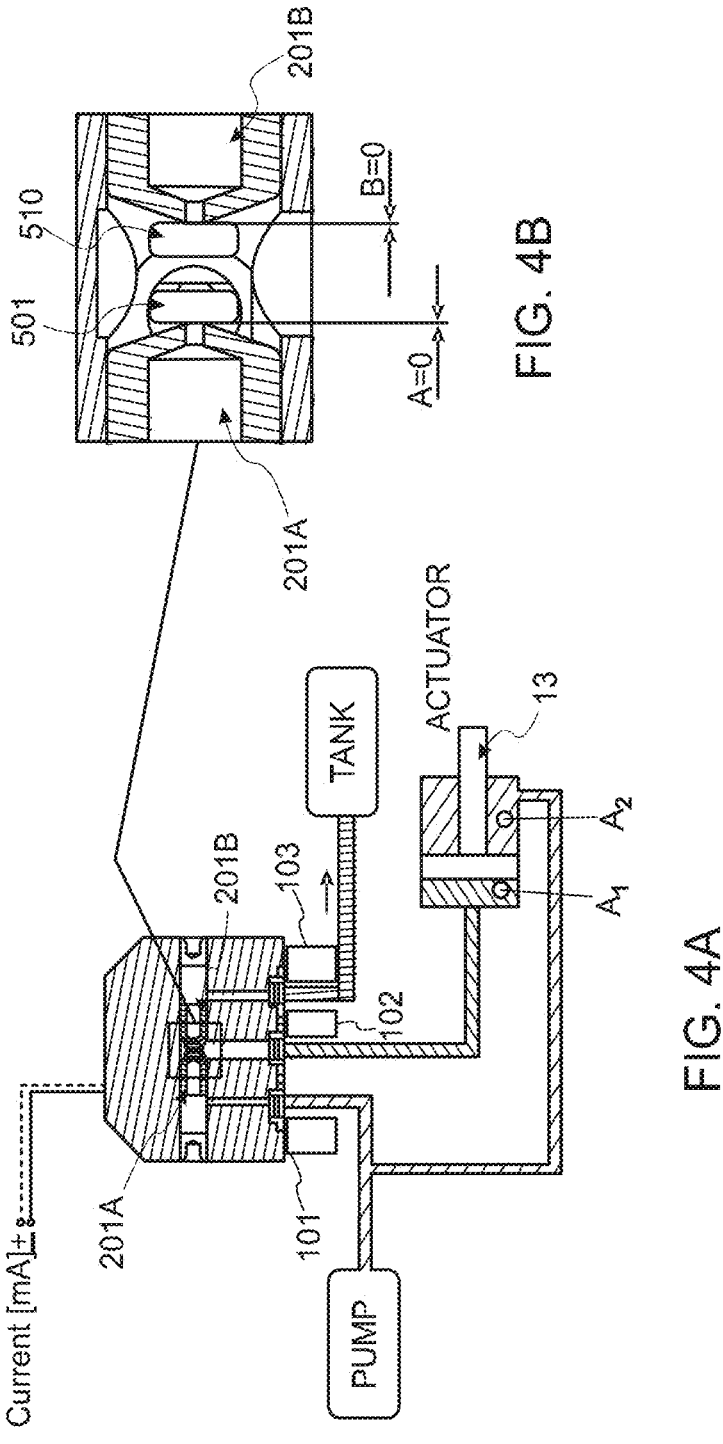
FIG. 4A shows a servo valve assembly according to the disclosure, in a neutral position.
FIG. 4B shows the nozzles and flappers of FIG. 4A in close-up.

In a balanced or neutral position, the flappers 501, 510 are positioned such that the second end 503 of the first flapper 510 is adjacent, and closes the first nozzle 200A—i.e. that the second end of the first flapper is positioned to the leftmost side of region S in the FIGS. As, for best operation, the flapper should extend vertically downwards from its motor 600A along flapper axis YA, the motor 600A is offset towards the first nozzle 200A, in the direction of valve body axis X, from the centre of the region S between the nozzles. One the other side of the valve body, the second flapper 510 extends from its motor 600B such that its second end 512 lies adjacent and closes the second nozzle 201B. Again, this can be achieved by positioning the second motor offset from the centre towards the second nozzle 201B, with the second flapper 510 then extending vertically from the second motor along axis YB. Thus, in the neutral position, the second ends of the first and second flappers are axially spaced apart from each other in the region S between the nozzles, each abutting against and, therefore, closing the respective nozzle. Fluid cannot, therefore, flow through either nozzle and so the fluid pressure at each end of the valve body is equal. FIGS. 4A and 4B show the overall assembly of the servo valve, fluid supply pump, return tank and actuator, when the servo valve is in this neutral position. As the first nozzle 201A is blocked by the first flapper 501. No fluid flows from the pump to the control port 102 and due to the second nozzle 201B being closed by the second flapper 510, there is no flow to the return tank via the return port 103. Due to the equal pressure, the actuator piston 13 remains at its neutral or zero position. In this neutral position, because each nozzle has its own flapper, there is no gap (A=0, B=0, FIG. 4B) between the flapper and the nozzle and so no fluid leakage.

Figures 5A, 5B:
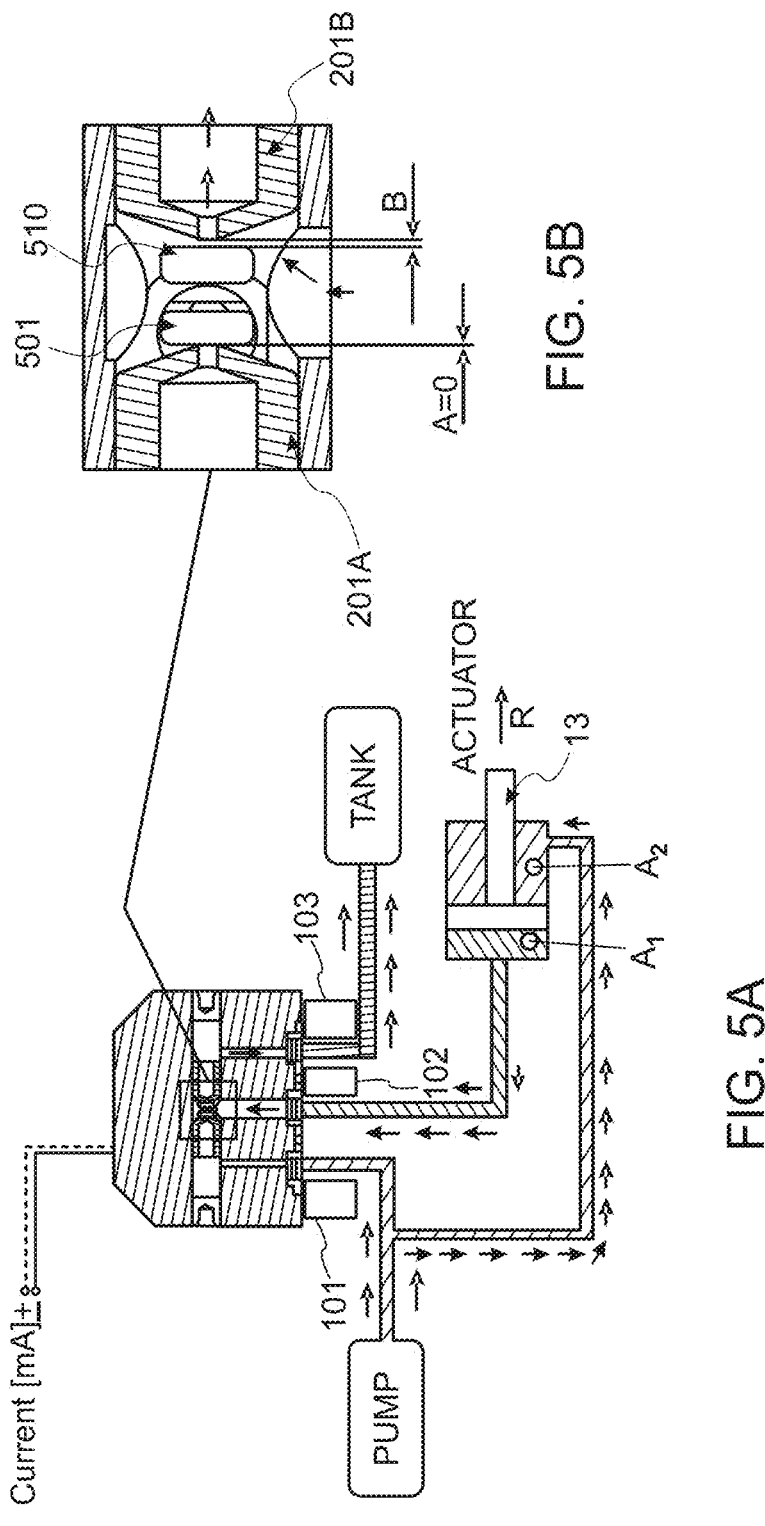
FIG. 5A shows a servo valve assembly according to the disclosure, in a first operating position.
FIG. 5B shows the nozzles and flappers of FIG. 5A in close-up.

If it is desired to move the actuator piston 13 in the retract direction (i.e. direction R in FIG. 5A, more fluid needs to be provided, from the servo valve, to chamber A2 to increase the pressure relative to chamber A1. For such operation, the servo valve is controlled, but a current command to the motors 600A, 600B, to move the second flapper 510 away from the second nozzle 201B whilst keeping the first flapper 501 in its closed position against the first nozzle. The servo valve is therefore set to a position in which the first nozzle 201A is closed so that fluid from the pump is directed to the actuator chamber A2 in preference to through the servo valve, and the second nozzle is open (A=0, B is not =0, in FIG. 5B). The pressure in chamber A2 therefore increases, pushing the piston 13 into chamber A1 in direction R. The fluid from chamber A1 is therefore forced out of the actuator into the servo valve via the control port 102. Because the second nozzle 201B is open, the fluid can flow through that nozzle to the return port 103 and out of the servo valve to the return tank.

Figures 6A, 6B:
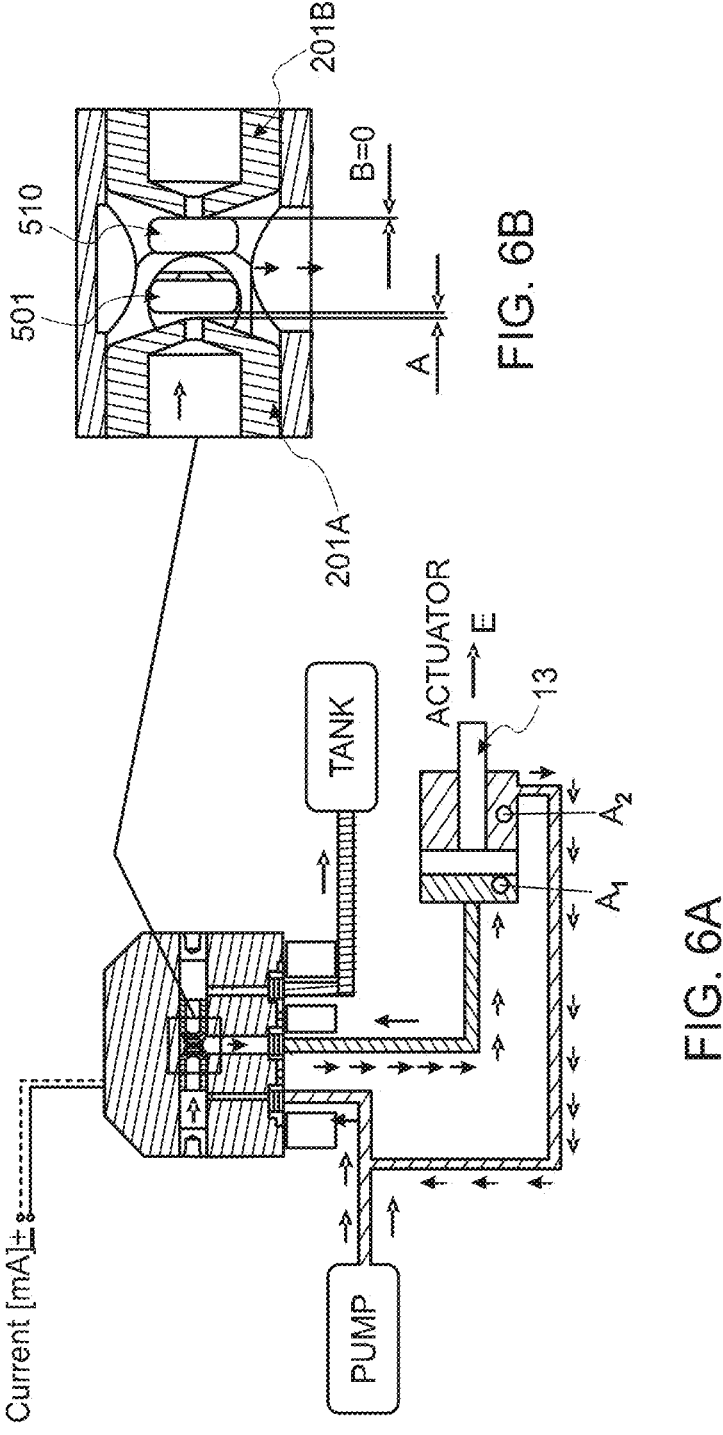
FIG. 6A shows a servo valve assembly according to the disclosure, in a second operating position.
FIG. 6B shows the nozzles and flappers of FIG. 6A in close-up.
Figures 7A, 7B:
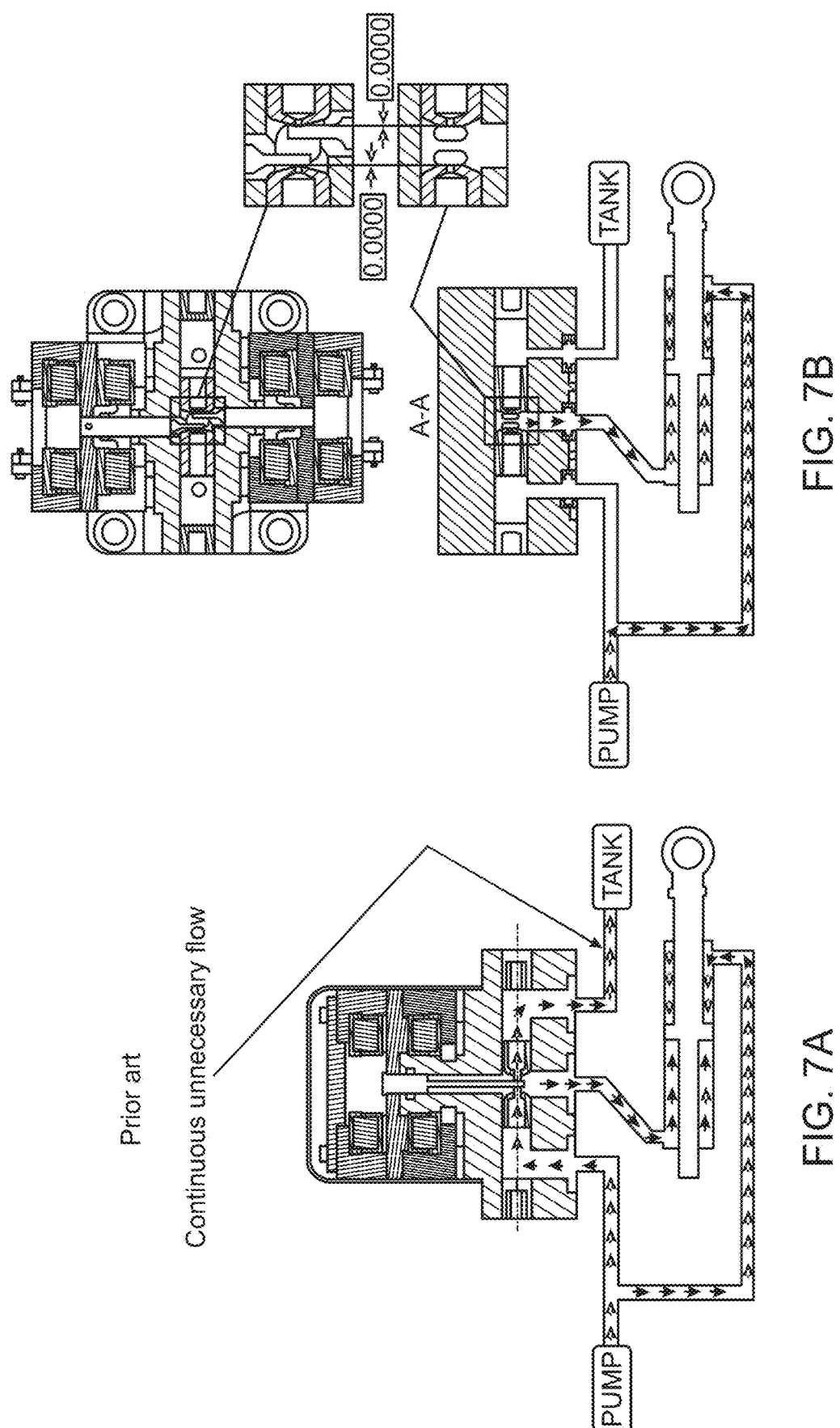
FIGS. 7A and 7B show, respectively, a known servo valve assembly in a neutral position and a servo valve assembly according to the disclosure, for comparison.

FIGS. 6A and 6B show the operation of the system when the servo valve is in a second operating position where the first flapper 501 is moved away from the first nozzle (201A)—i.e. A is not equal to 0 (FIG. 6B) and the second flapper 510 remains in the closed position against the second nozzle 201B (i.e. B=0, FIG. 6B). Now, fluid from the pump flows through the servo valve from the supply port 101, via the first nozzle 201A and out through the control port 102 into chamber A1 of the actuator. No fluid can flow from the control port to the return tank because the second nozzle 201B is closed. The increased pressure in chamber A1 forces the piston in the extension direction E into chamber A2, this forcing fluid out of chamber A2 and back into the system.

Figures 2A, 2B:
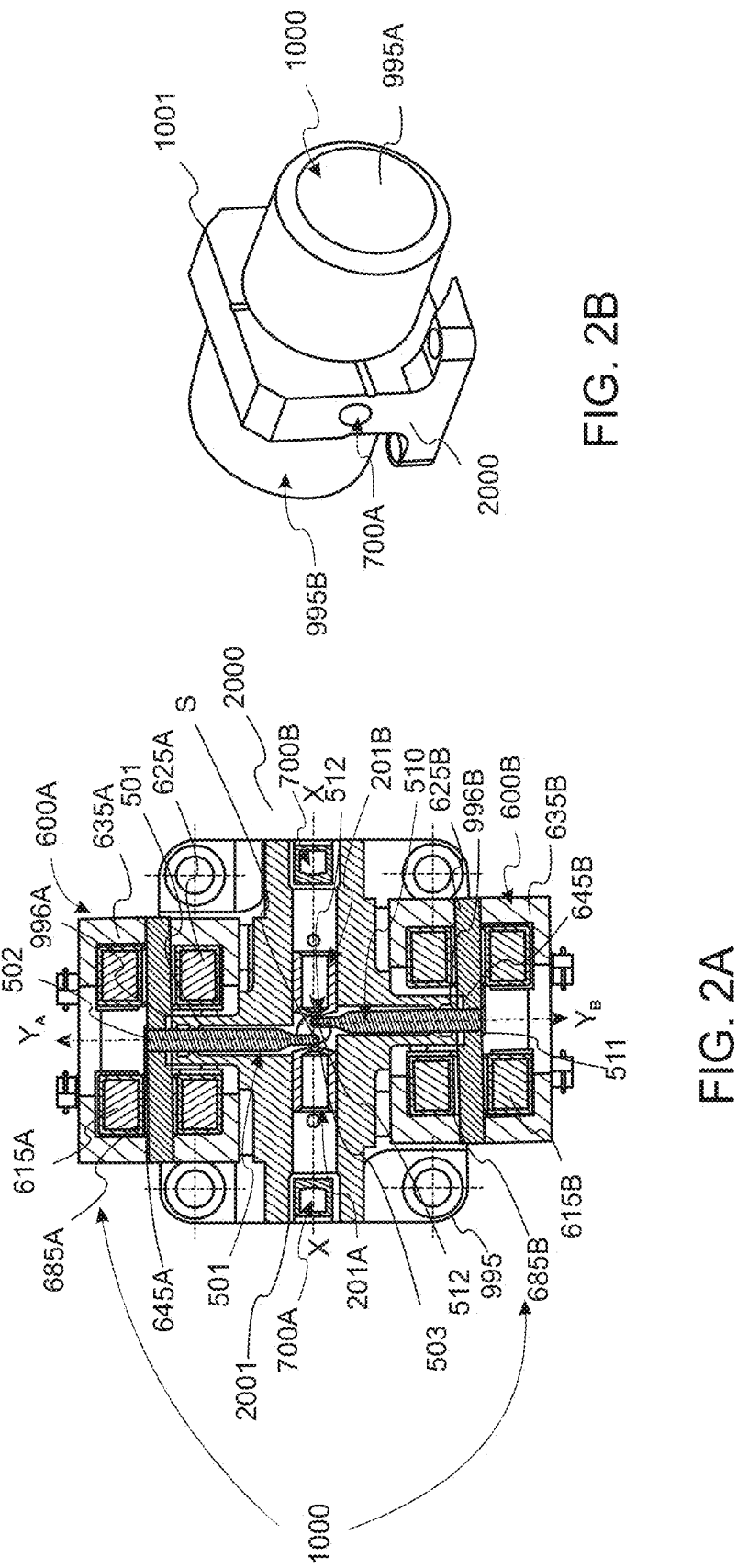
FIG. 2A shows a section view of a servo valve according to the disclosure.
FIG. 2B shows a 3D view of a servo valve as shown in FIG. 2A.
Figures 3A, 3B:
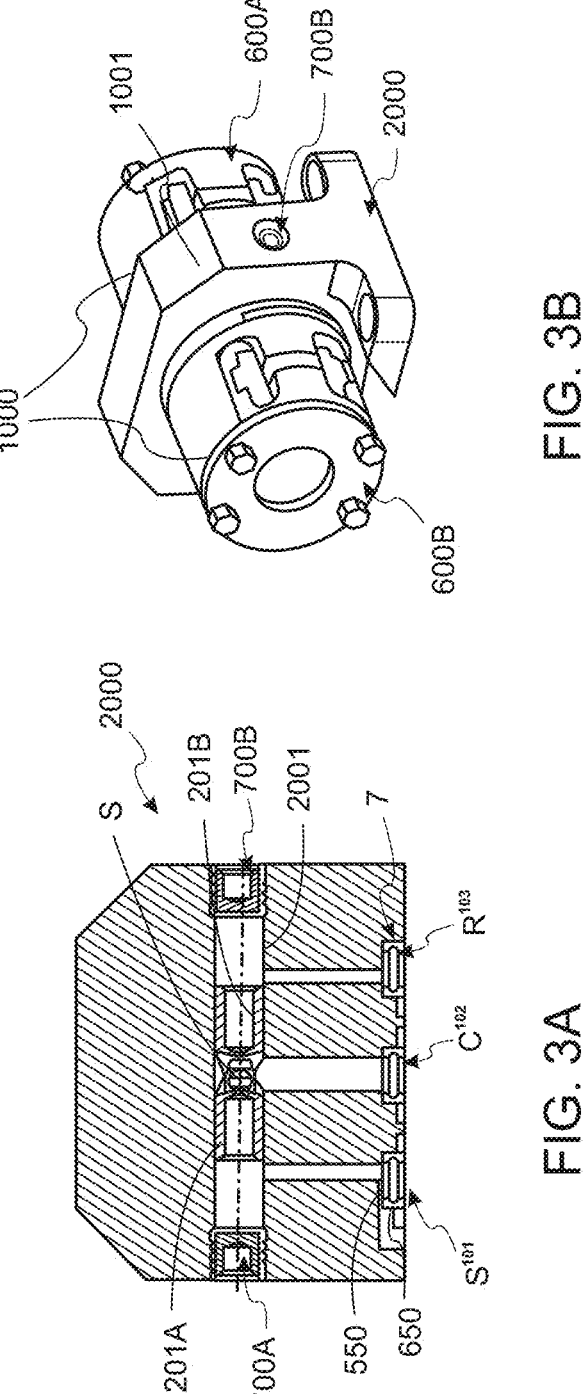
FIG. 3A shows a detail of the valve body and ports of a servo valve such as shown in FIG. 2A.
FIG. 3B is a 3D view showing the corresponding parts of FIG. 3A.

To make the assembly more compact, the first and second motors can be mounted around the valve assembly and housed as a single unit such as shown in FIG. 2B.

By comparing the conventional assembly (FIG. 7A) with an assembly according to this disclosure (FIG. 7B) in the neutral position, it can be seen that there is no unnecessary flow between the pump and the first nozzle or between the second nozzle and the return tank, in the present system, as there is in the known system. In the known system, because there is only a single flapper, its neutral position is necessarily equidistant between the two nozzles and there is, therefore, always a small gap between the flapper and the nozzles.

The arrangement of the assembly according to this disclosure therefore provides a more efficient single stage servo valve which only needs relatively small flapper displacement for higher pressure and which does not require oversized fuel pumps. Such servo valves could, therefore, be used in applications where currently only two stage servo valves are used. The use of smaller pumps means that the system can be smaller and lighter.

Another advantage of this arrangement is that the spacing between the nozzles can be made larger, since there is no need for a single flapper to be required to move enough to reach each nozzle. A larger gap can be beneficial in that it is less vulnerable to contamination. The lack of constant fluid flow at the nozzles in all positions also means that there is less wear on the nozzles.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A single stage servo valve assembly comprising:
a drive assembly; and
a valve body assembly, the valve body assembly defining:
a valve body extending along a valve body axis (X) between a first valve body end and a second valve body end;
a supply port, a control port and a return port formed through the valve body each defining a respective fluid flow channel, having a fluid flow axis, providing fluid communication between an interior of the valve body and an exterior of the valve body;
wherein the drive assembly operates to control the flow of fluid between the supply port, the control port and the return port, via the interior of the valve body, in response to an electric command signal;
wherein a first nozzle is located in the valve body between the supply port and the control port and a second nozzle is located between the return port and the control port, the first nozzle defining a first fluid flow path from the supply port to the control port and the second nozzle defining a second fluid flow path between the control port and the return port;
wherein the drive assembly comprises:
a flapper extending in a direction essentially perpendicular to the valve body axis from a first end in connection with the drive assembly to a second end that extends into a space(S) between the first nozzle and the second nozzle, the second end being moveable by drive assembly, relative to the nozzles;
wherein the drive assembly comprises a first motor located on a first side of the valve body and a second motor located on a second side of the valve body opposite the first side as defined with respect to the valve body axis, and
wherein the flapper comprises:
a first elongate flapper extending along a first flapper axis $Y_A$ from a first end in driving engagement with the first motor to a second end in the space(S), and a second elongate flapper extending from a first end in driving engagement with the second motor along a second flapper axis $Y_B$ to a second end in the space(S);
wherein the second end of the first flapper is located adjacent the first nozzle and the second end of the second flapper is located adjacent the second nozzle.

2. The assembly of claim 1, where the first flapper axis $Y_A$ is offset along the valve body axis X relative to the second flapper axis $Y_B$.

3. The assembly of claim 1, wherein the first motor is a first torque motor and the second motor is a second torque motor.

4. The assembly of claim 1; further comprising:
a first plug at the first end of the valve body and a second plug at the second end of the valve body.

5. The assembly of claim 1, in combination with a housing to contain the assembly as a single unit.

6. An actuator assembly comprising:

an actuator comprising:

an actuator housing; and an actuator piston moveable within the actuator housing; and a servo valve assembly as claimed in claim 1, fluidly connected to the actuator such that fluid flow through the actuator controls movement of the piston in the housing.

7. The actuator assembly as claimed in claim 6, further comprising:

a supply of pressurised fluid in fluid communication with the supply port and with the actuator housing.

8. The actuator assembly of claim 7, wherein the supply comprises a fluid pump.

9. The actuator assembly of claim 6, further comprising:

a tank in fluid connection with the return port.

10. The actuator assembly of claim 6, further comprising an electric power supply for the drive assembly.

* * * * *